Sept. 27, 1932.  H. I. MORRIS  1,879,409
PROCESS OF AND APPARATUS FOR MAKING PIPES OR CYLINDERS
Filed Oct. 1, 1929   5 Sheets-Sheet 1
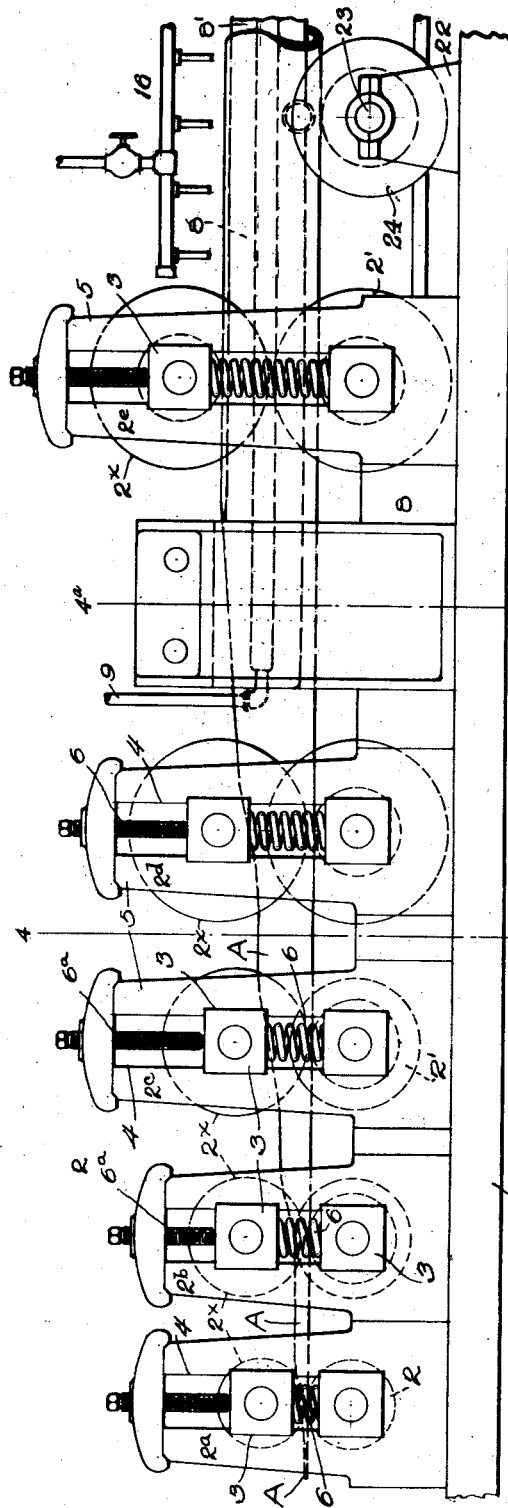
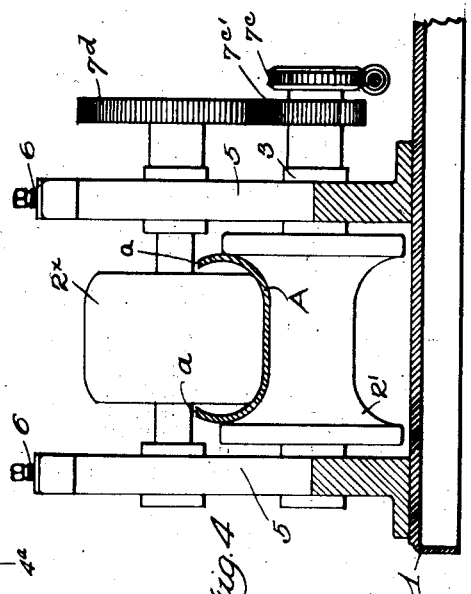
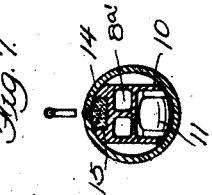
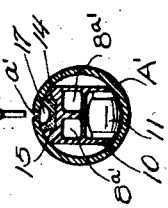
INVENTOR
Howard I. Morris
BY
Jno. B. Pitts
ATTORNEY Sept. 27, 1932. H. I. MORRIS 1,879,409
PROCESS OF AND APPARATUS FOR MAKING PIPES OR CYLINDERS
Filed Oct. 1, 1929 5 Sheets-Sheet 2
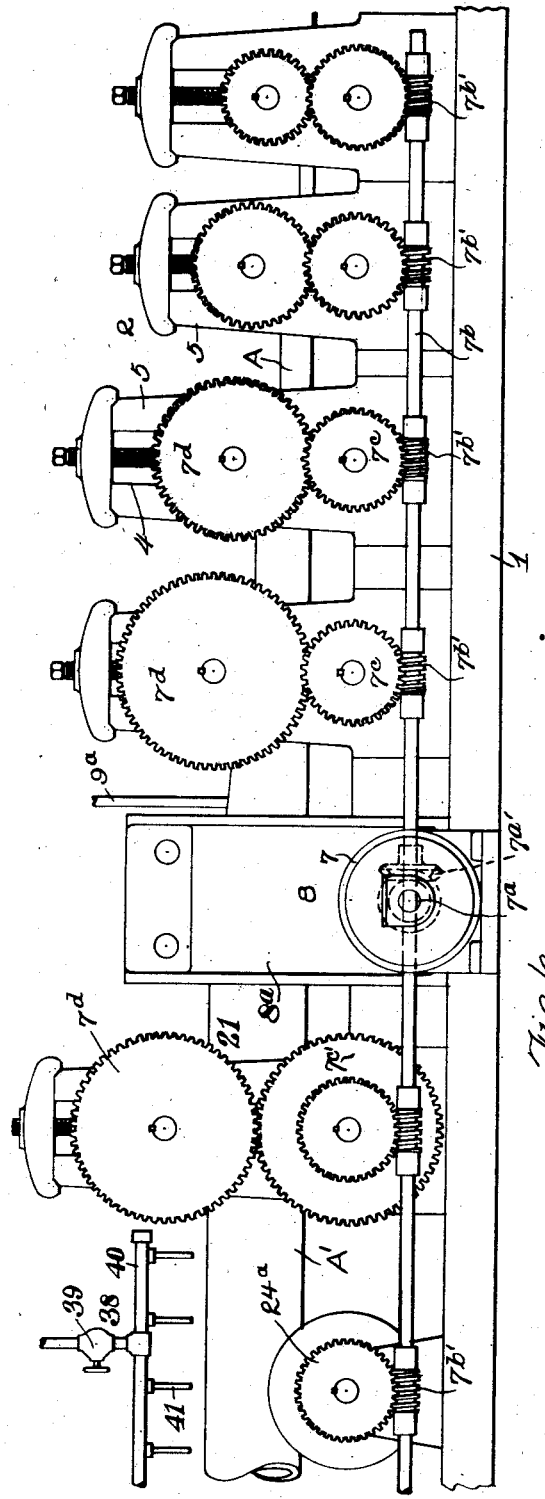
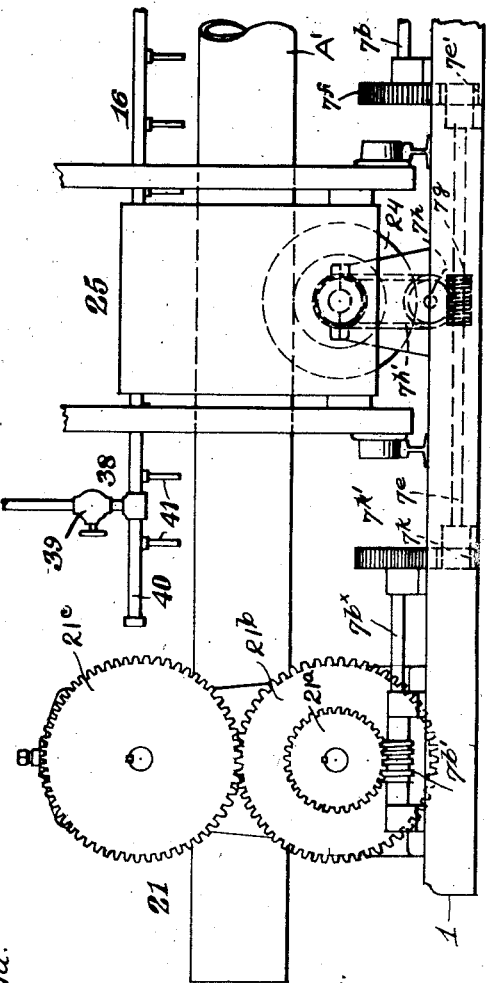
INVENTOR
Howard I. Morris
BY Geo. B. Pitts
ATTORNEY Sept. 27, 1932.  H. I. MORRIS  1,879,409
PROCESS OF AND APPARATUS FOR MAKING PIPES OR CYLINDERS
Filed Oct. 1, 1929  5 Sheets-Sheet 3
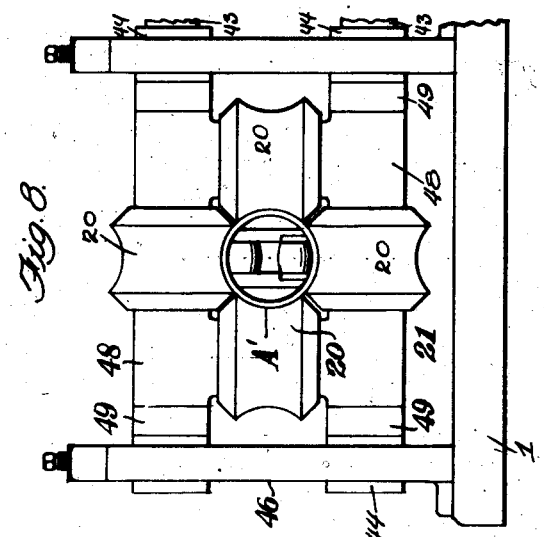
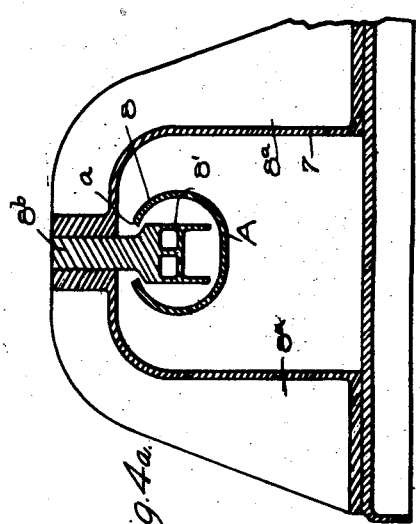
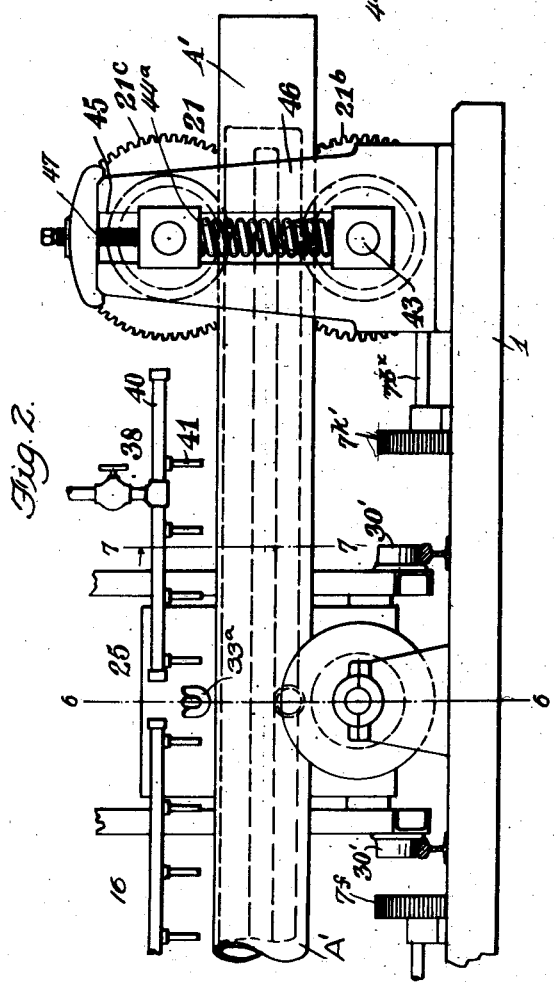
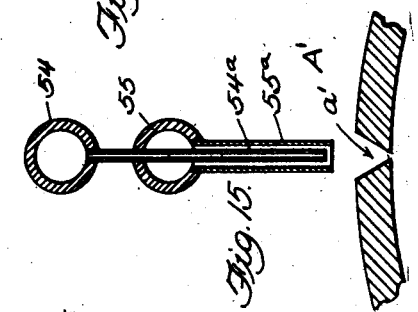
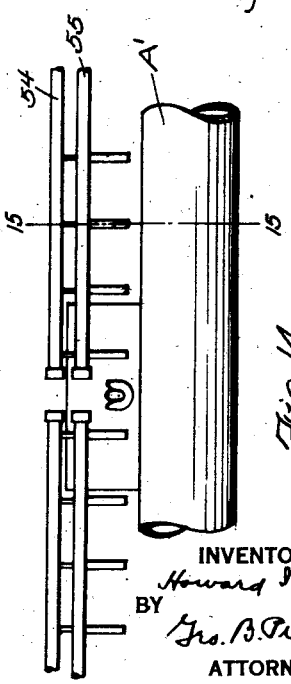
INVENTOR
Howard I. Morris
BY
Geo. B. Pitts
ATTORNEY

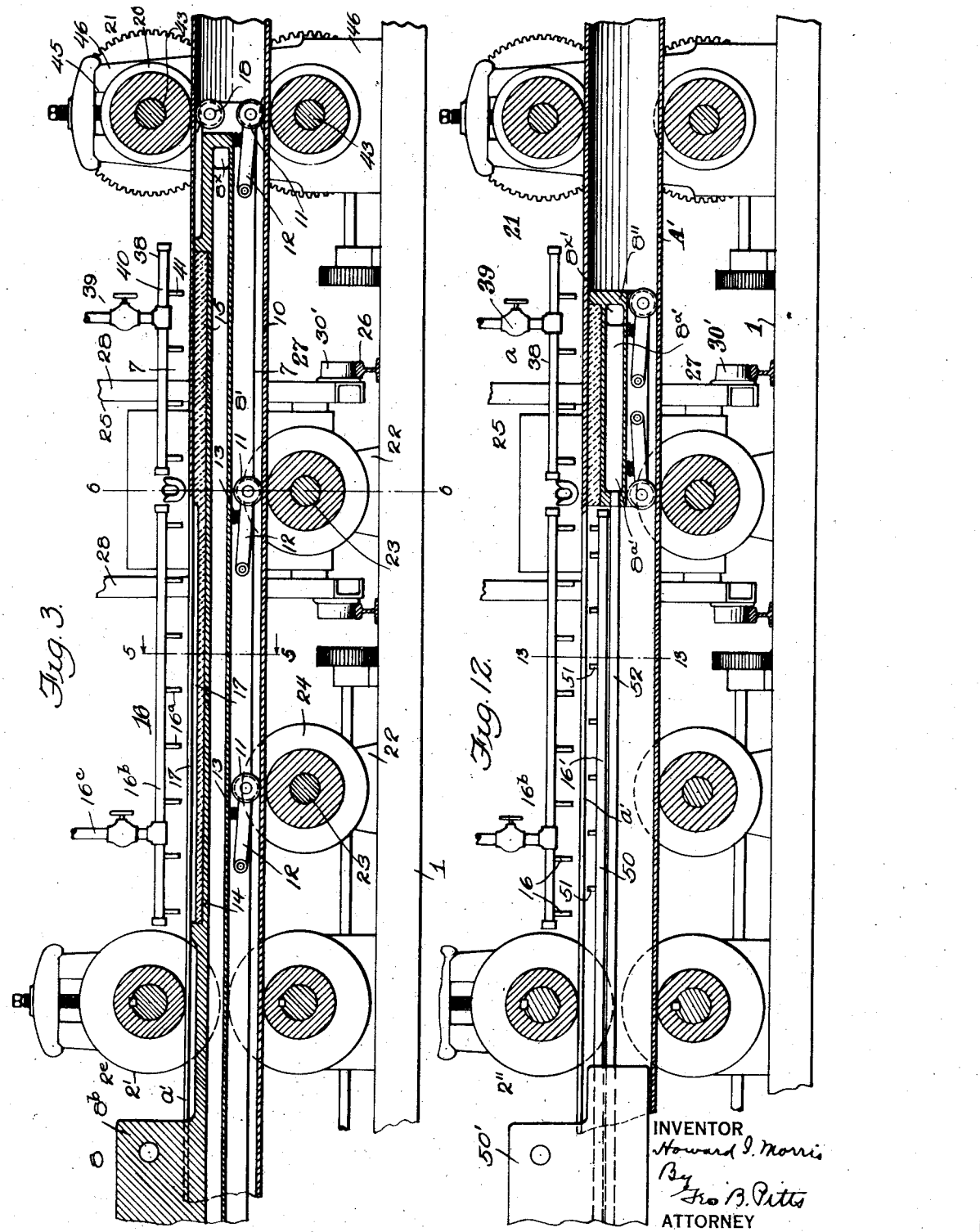

Sept. 27, 1932.  H. I. MORRIS  1,879,409
PROCESS OF AND APPARATUS FOR MAKING PIPES OR CYLINDERS
Filed Oct. 1, 1929   5 Sheets-Sheet 5

INVENTOR.
Howard I. Morris
BY Geo. B. Pitts
ATTORNEY

Patented Sept. 27, 1932

1,879,409

UNITED STATES PATENT OFFICE

HOWARD I. MORRIS, OF LAKEWOOD, OHIO, ASSIGNOR TO CARL M. YODER AND HARVEY O. YODER, BOTH OF LAKEWOOD, OHIO

PROCESS OF AND APPARATUS FOR MAKING PIPES OR CYLINDERS

Application filed October 1, 1929. Serial No. 396,553.

This invention relates to a process of and apparatus for making pipes which are gas and liquid tight from end to end, whereby they may be used for various purposes, for example, for storing gas or liquid and for conveying these products over long distances without danger of leakage or waste. My apparatus is capable of successively forming pipes each from a metal sheet or blank and sealing the seams by welding in one continuous operation at a relatively high rate of speed. The process and apparatus herein disclosed is adapted to completely form pipes or pipe sections having substantially a diameter of twelve inches, a length of twenty feet or more and a thickness of one-fourth or three-eighths of an inch, but these dimensions are not important as pipes or pipe sections of any desired length and diameter may be made according to my process and apparatus, except where the thickness of the pipe walls is relatively thin.

One object of the invention is to provide an improved process of forming a pipe or pipes with a sealed seam or joint in a rapid and economical manner.

Another object of the invention is to provide an improved apparatus for forming blanks into pipes and sealing or welding the seams or joints thereof in a rapid and economical manner.

Other objects of the invention will be apparent to those skilled in the art to which my invention relates from the following description.

In my process I first take a blank of the desired width, length and thickness and by means of suitable shears, cutters or grinders bevel the longitudinal side walls of the blank from end to end, the bevel extending from the upper face of the blank inwardly, so that when the blank is finally shaped into pipe form, these walls cooperate to form between them a substantially V-shaped groove extending longitudinally from end to end of the pipe. It will be noted that when the longitudinal side walls of the blank are at right angles to the faces of the blank a V-shaped groove will result between them when the blank is finally shaped and this groove is or would be adapted to receive molten metal, one of the steps of my process, as hereinafter explained, to effect a welded seam or joint, but I prefer to bevel the longitudinal side walls, as above described, to provide a groove having a relatively large or wide opening so that the introduction of the molten metal may be more readily carried out and also to insure that an adequate amount of metal is introduced into the seam groove, especially in making the larger sizes of pipes, since in carrying out this step of my process I rely to a large extent upon the high temperature of the molten metal, as hereinafter explained, to increase the heat of the metal constituting the walls of the groove to effect a weld between them. Next, the blank is fed endwise to and between a plurality of sets of shaping elements, which successively shape the blank into a cylinder or pipe, thereby bringing the longitudinal, beveled side walls of the blank together in opposed relation with their inner edges substantially in contact or abutting relation to thus substantially close the bottom of the V-shaped groove.

Next, I preheat the walls of the groove and metal along or adjacent to these walls to a temperature slightly below the melting point of the metal of which the pipe is formed. For example, if the pipe is formed from a low carbon steel having a melting point of 2520 degrees F., I prefer to preheat the walls of the groove to a temperature of 2000 to 2200 degrees F., the purpose being to heat the metal up to or near its melting point and then to utilize the excessive heat of the welding charge or molten metal introduced into the groove to bring the surfaces of the groove walls up to a melting condition, so that the supplied molten metal and metal forming the groove walls will readily flow or fuse together into one mass and thus form or effect a weld. The preheating is effected by causing relative movement between the preheating means and the pipe, but as the blanks are fed or moved longitudinally through the sets of shaping devices, I prefer to hold the preheating means stationary and move the pipes relative thereto, the driving of the sets of shaping devices serving to move the pipes endwise relative to the preheating means, as well as the molten metal supply means to be later referred to.

Next, I introduce or pour into the seam groove superheated molten metal, preferably having substantially the same physical and chemical characteristics as the metal of which the pipe is formed, the pouring of this metal taking place so long as the pipe moves endwise, and sufficient quantity being supplied to fill the groove from end to end substantially level with the exterior surface of the pipe. The metal to be used for charging or filling the seam groove is first melted and then superheated to a temperature in excess of its melting temperature.

Where the metal of the pipe is a low carbon steel having a melting temperature of 2520 degrees F., I prefer to heat the molten metal to a temperature of approximately 3200 to 3300 degrees F., the purpose being to introduce molten metal into the seam groove which has a temperature in excess of the temperature of the walls of the groove sufficient to raise the temperature of the surfaces of these walls to their melting point, so that the molten metal supplied to the groove and the metal constituting the surfaces thereof will as already explained fuse into one mass which, on cooling, will effect a weld. This step of my process therefore involves the supply of superheated metal to the seam groove and the heating of the walls of the groove to their melting point to effect fusion of the molten metal and metal of the groove walls into an integral mass.

Next, I supply heat to the metal supplied to the groove. The heat thus supplied is sufficient to maintain the surface of the metal in the seam groove melted or in its molten state for a short period of time to allow any gases within or generated within the molten metal in the seam groove to escape. If desired, the interior of the pipe may be cooled the effect of which is to permit the setting of the molten metal at the bottom of the groove first and allow setting to take place gradually upwardly.

Finally, I pass the pipe between a set of rolls the purpose of which is to roll down and compress or work the metal in the seam and where desirable, effect sizing and final shaping of the pipe. This step of my process is preferably carried out while the metal supplied to the seam groove is still at a relatively high temperature but after it has become set.

In forming or shaping and welding pipes according to my process, the sections are passed through the shaping devices at a rapid rate of speed, substantially sixty feet per minute, and this speed is maintain for each pipe until it is discharged from the rolling down and sizing rolls, and the blanks are fed successively and in close relation to each other.

I have shown in the accompanying drawings an apparatus capable of carrying out the steps of my process; and although such apparatus embodies novel features of construction, it will be understood that my process is not to be limited to the specific apparatus or parts thereof herein shown.

In the drawings,

Figs. 1 and 2 are side elevations, which together show an apparatus embodying my invention and capable of carrying out my process.

Figs. 1a and 2a are fragmentary side elevations of the parts shown in Figs. 1 and 2, respectively, but looking at the opposite sides thereof.

Fig. 3 is a fragmentary, longitudinal sectional view through a portion of the apparatus.

Fig. 4 is a section on the line 4—4 of Fig. 1.

Fig. 4a is a section on the line 4a—4a of Fig. 1.

Fig. 5 is a section on the line 5—5 of Fig. 3.

Fig. 7 is a section on the line 7—7 of Figs. 2 and 3.

Fig. 8 is an elevation looking towards the left of Fig. 2.

Fig. 12 is a fragmentary longitudinal section showing a slightly different form of construction embodying my invention, Fig. 13 is a section on the line 13—13 of Fig. 12.

Fig. 14 is a fragmentary view showing another form of construction.

Fig. 15 is a section on the line 15—15 of Fig. 14.

Figure 6:
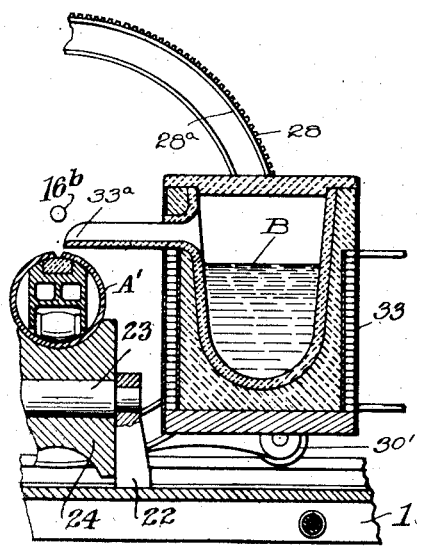
Fig. 6 is a section on the line 6—6 of Figs. 2, 3 and 9.

In the drawings, 1 indicates a support which may be cast in one piece or formed in sections and related one to another to support the several mechanisms or certain thereof to be hereinafter described. 2 indicates as any entirety the sets of shaping devices mounted on the support 1. The sets of devices 2 comprise pairs of rolls 2a, 2b, 2c, 2d and 2e, which co-act to progressively form or bend a blank A into cylindrical or pipe shape, as shown at A', in Fig. 2 and at the left end of Fig. 11. The blank A is of the desired size with respect to width, length and thickness and the side walls thereof are beveled from end to end as shown at a, so that there results a V-shape seam groove a' with the inner edges of these side walls in relatively close relation or substantially in contact. The rolls 2', 2x, of each pair are preferably fixed to shafts suitably mounted at their ends in bearing boxes 3, which are slidable in guides 4 formed in suitable standards 5, to permit their removal and the adjustment of the upper roll of each pair relative to the lower roll. The boxes 3 for each pair of roll shafts are held in spaced relation by suitable compression springs 6 and the upper boxes are adjusted against the tension of the springs by screws 6a, in a well known manner. Either or both rolls of each pair or certain thereof are driven in any well known manner by a suitable drive means hereinafter described. Where both rolls of a pair are driven, one roll is preferably driven by the other roll of the pair.

The drive means preferably comprise a power driven member 7, fixed to a shaft 7a. The shaft 7a is provided with a bevel gear 7a' meshing with a bevel gear fixed to a shaft 7b extending longitudinally of the support 1. The shaft 7b is provided with a plurality of worms 7b' one for each roll or set of rolls to be driven. The shaft for each roll 2' is extended and carries a worm gear 7c in mesh with the adjacent worm 7b' and a spur gear 7c' in mesh with a spur gear 7d on the extended portion of the shaft for the adjacent roll 2x.

8 indicates an upright member or support preferably disposed between the sets of rolls 2d, 2e. The member 8 comprises spaced side portions 8a and an intermediate portion 8b which depends downwardly within the blank A and supports the inner end of a mandrel, indicated as an entirety at 8', which extends in an endwise direction toward the opposite end of the support 1. By supporting the mandrel 8' rearwardly of the rolls 2e, provision is made to support the inner end of the mandrel while permitting the blank A to be formed around the mandrel into final shape with its side edges in close relation.

The mandrel 8' comprises a relatively long member the upper and lower walls of which are curved to conform to the internal curvature of the pipe A' (see Figs. 5 and 7). The body portion of the mandrel is preferably formed with a pair of conduits 8a' extending longitudinally thereof and connected at their outer ends by a passage 8x, one conduit being connected with a supply pipe 9 and the other conduit being connected with a discharge pipe 9a, whereby a suitable cooling medium, such as water, may circulate through and from end to end of the mandrel. The lower portion of the mandrel 8' is formed with a longitudinally extending groove or channel 10, the purpose of which is to accommodate a plurality of rollers 11 to reduce the friction between the mandrel and inner wall of the pipes while supporting the mandrel in relation to the upper portion of the pipes A'. The rolls 11 are spaced along the mandrel and each is preferably mounted on the outer end of a link 12, pivoted at its inner end on the side walls of the channel. Between each link 12 and the bottom of the groove 10 is a coiled spring 13 under tension which serves normally to press the mandrel 8' against the upper portion of each pipe as the latter moves endwise relative to the mandrel. The upper portion of the mandrel 8' is formed with a longitudinally extending groove or channel 14 disposed below the seam groove and having a width equal to or greater than the area of the pipe walls which are or may be heated. The groove or channel 14 is filled with a suitable refractory material 15 to protect the mandrel from the high temperatures to which the walls of the seam groove and adjacent portions of the pipe walls are subjected, as well as to close the bottom of the groove a' when the molten metal is poured thereinto, as will later appear. That portion of the refractory material 15 extending from a point slightly rearward of the molten metal pouring position or station rearwardly for a distance greater than or co-extensive with the preheating means, indicated as an entirety at 16, is formed with a groove 17 in line with the seam groove. The groove 17 is wider than the seam groove a' and its walls curve upwardly at either side thereof so as to deflect the heat or flames or both from the preheating means 16 upwardly against the inner walls of the pipe A' at either side of the groove a'.

18 indicates a roller loosely mounted on a shaft 19 at or adjacent to the free end of the mandrel 8' and serving as an anvil within the pipe below the seam rolling down roller 20 of the rolling down and sizing rollers indicated as an entirety at 21.

22 indicates a plurality of standards mounted on the support 1 and in spaced relation longitudinally thereof. Each of the standards 22 supports the opposite ends of a shaft 23, on which is mounted a roller 24. These rollers support the pipes as they move forwardly and indirectly support the mandrel, so as to guide the pipes and maintain them in operative relation to the preheating means 16 and the mechanism for supplying and pouring the molten metal, this mechanism being indicated as an entirety at 25. As shown the peripheries of the rollers 24 are of curvilinear shape in cross section so as to guide as well as support the pipe sections A'. By preference, each roller 24 is driven. To effect driving of each roller, its shaft has an extended portion which carries a worm gear 24a in mesh with the adjacent worm 7b'. Where a supporting and guiding roll 24 is provided adjacent the mechanism 25, as shown in the drawings, I drive such roll through a counter shaft 7e having a gear 7e' in mesh with and driven by a gear 7f fixed to the shaft 7b. The shaft 7e carries a worm 7g meshing with a worm on a transverse shift 7h, the latter carrying a sprocket for a chain 7h' which, through a sprocket on the shaft 23 (see Fig. 2a) drives the roll 24 on the latter. To provide room for the mechanism 25, the shaft 7e is utilized to transmit power to that portion 7bx of the shaft 7b which is extended along the support 1 (see Fig. 2a) to a point where power may be obtained therefrom to drive the rolling down and sizing rollers 21. For this purpose, the shaft 7e is provided with a gear 7k which meshes with a gear 7k' fixed to the shaft 7bx.

The preheating means 16 preferably comprise a plurality of flame jets or nozzles 16a extending in spaced relation in line with and above the seam groove A' so as to project the flames directly against the walls of the groove and also through it into the deflecting groove 17, so that heat may be applied to the inner surfaces of the pipe at opposite sides of the groove. While the inner edges of the seam groove a' are substantially in contact, as already described, due to the roughness of the metal, sufficient space or spaces result to permit the heat and flames to pass through the groove so as to effect heating internally to supplement the application of the heat to the exposed walls or surfaces. By preference, the lower edges of the groove a' are spaced approximately $\frac{1}{16}$ inch, this spacing being provided by proper shaping of the sets of shaping rolls 2. The flames from the jets 16a are sufficient in number and size to heat the walls of the seam groove a' and adjacent portions of the metal so that by the time the progressive portions of the pipe A' reach the molten metal pouring station, the walls of the groove a' will have a temperature slightly below their melting point, as already set forth in describing the process. Where it is found that the walls of the seam groove a' and adjacent portions of the pipe walls are not sufficiently heated to effect a proper weld when the molten metal is introduced into the seam groove, I may provide an auxiliary preheating means 16', as shown in Fig. 12, to which reference will later be made. The fuel for the jets 16a may be of any desired character; for example, such fuel may be of a gaseous or liquid character, in which event, the jets are connected to a supply pipe 16b and this pipe in turn is connected to a main valved supply pipe 16c.

Figure 10:
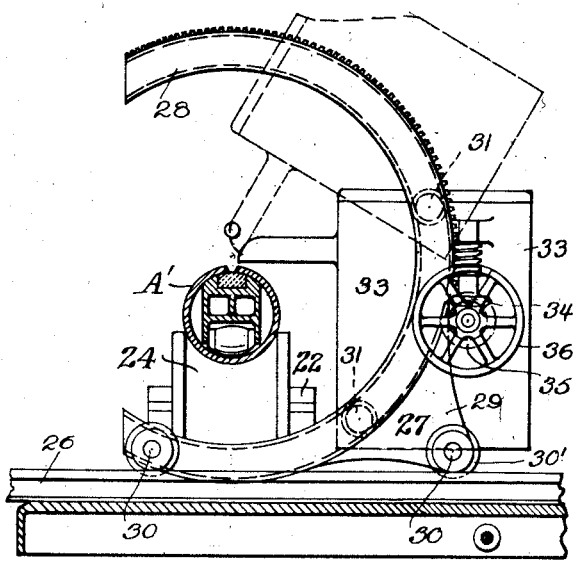
Fig. 10 is a section on the line 10—10 of Fig. 9.
Figure 9:
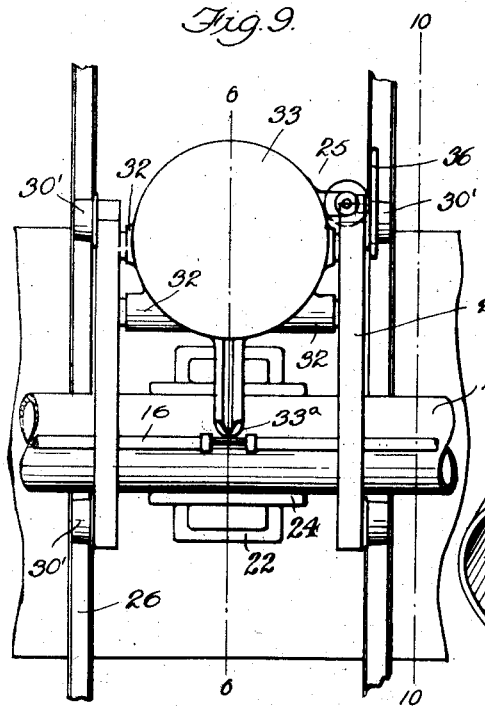
Fig. 9 is a fragmentary plan view of the mechanism for introducing the superheated molten metal.

Referring to the mechanism 25 for supplying and pouring molten metal into the seam groove a': 26 indicates a track extending at an angle to the direction of movement of the pipes A' and supporting a carriage 27 which may be moved toward and from the pipes A'. The carriage 27 consists of a frame comprising spaced arc shaped members 28 and side plates 29 supported in spaced relation by a pair of axles 30, on which are mounted flanged wheels 30' engaging the tracks 26. The arc shaped members 28 are preferably formed from channel bars, having their channels in opposed relation. The flanges of the bars 28 form guides or runways 28a for pairs of rollers 31 loosely mounted on stud shafts mounted in bosses 32 provided on the opposite side walls of a holder 33. The holder 33 holds a quantity of superheated molten metal, indicated at B, and is adapted to be raised and tilted so as to pour the molten metal into the seam groove a', as the latter moves relative to it or its pouring spout or nozzle 33a, as shown in Fig. 10; for this purpose, the rollers 31 are so positioned on the holder 33 and the bars 28 so curved that with the carriage 27 in a predetermined position on the tracks 26, the outer or free end of the nozzle will maintain a substantially fixed relation to the seam groove a' as the holder is raised and tilted to effect pouring, as shown in dotted lines in Fig. 10. The nozzle 33a is disposed in a plane slightly above the seam groove a' and extends laterally from the upper portion of the holder so that its free end may be in pouring relation to the groove when the holder is in vertical position (see Fig. 6), which determines the pouring position for the carriage 27. Suitable means (not shown) such as a ratchet and dog, may be provided to hold the carriage in the pouring position. The construction just described permits the holder 33 to be filled to the level of the spout or nozzle 33a. The means for raising and lowering the holder 33 may comprise worm gear teeth on the outer side wall of one channel bar 28 and a worm in mesh therewith, the worm being mounted in suitable bearings provided on the adjacent side wall of the holder 33, and its shaft having a bevel gear 34 meshing with a bevel gear 35 also mounted in suitable bearings on the adjacent side wall of the holder and having a hand wheel 36 for rotating it. Where a worm and worm gear is used to raise and lower the holder 33, the worm will serve as a lock to maintain the holder in any position to which it is moved. The holder 33 may be of any desired size and its body portion and inner wall may be formed from suitable refractory material or materials to withstand the high temperature of the molten metal. As already explained, the molten metal to be poured into the seam groove is heated to a temperature ranging from 3200 to 3300 degrees F. The walls of the holder may have embedded in them a coil of copper pipe or wire through which a high frequency current flows and this will induce a low voltage, high frequency current in the metal, whereby the latter is melted. Where the metal is melted in this manner, it is also heated by the induced current to and maintained at the desired superheated temperature for introduction into the seam groove, as already set forth.

By preference, the tracks 26 extend laterally to either side of the path of movement of the pipe sections. This permits the use of two holders or pouring mechanisms 25, so that when the holder of one mechanism has been emptied and is being refilled or recharged, another such mechanism may be moved into position at the opposite side of the pipe and pouring continued.

Figure 11:
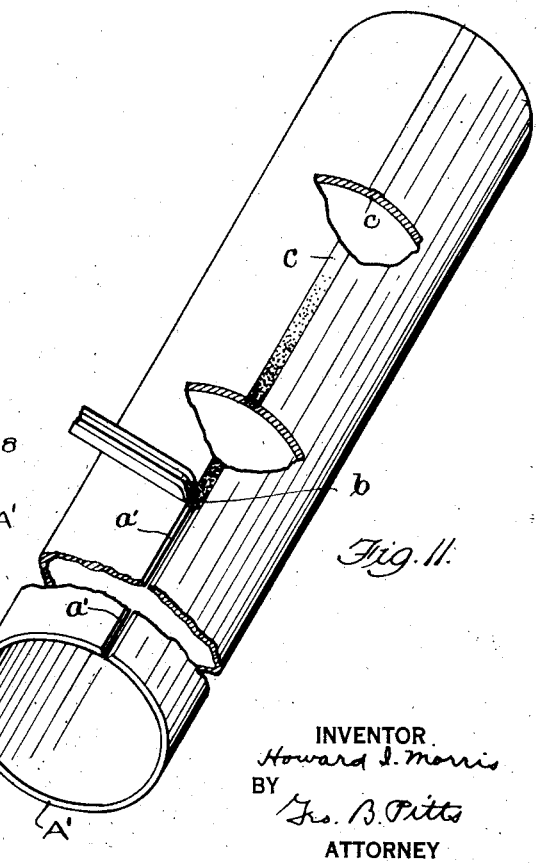
Fig. 11 is a perspective view of a portion of a pipe, parts thereof being broken away and illustrating the step of introducing the superheated molten metal into the seam or seam groove.

As will be understood, the pipe sections A' are fed or moved along the mandrel one after the other and the holder is raised and tilted sufficiently to effect pouring of the molten metal into the seam groove $a'$ as each pipe moves endwise past the nozzle 33a, the raising of the holder being continued and at such rate of speed as to insure the filling of the groove during such movement as shown at $b$, (Fig. 11). As the supplied molten metal has a temperature in excess of its melting temperature and that of the walls of the seam groove and the walls of the latter have a temperature slightly below their melting point, the excessive heat of the supplied molten metal will raise the temperature of the seam groove walls to or above their melting point, with the result that fusing of these walls and the supplied molten metal will result, as indicated at $c$ (Fig. 11).

38 indicates an auxiliary heating means disposed beyond the pouring mechanism 25, the purpose of these means being to prevent a too rapid cooling and setting of the molten metal and thus to allow gases therein or generated therein to escape. The heating means 38 is preferably disposed above the pipe, so that setting may start at the bottom of the groove and progressively take place upwardly. The auxiliary heating means 38 preferably comprise a valved supply pipe 39, connected to a conduit 40, from which depend flame jets or nozzles 41. The nozzles 41 are in spaced relation and disposed above and in alignment with the filled seam, the first nozzle being relatively close to the pouring nozzle 33a. Any number of nozzles 41 may be provided, as may be found necessary. As shown in Fig. 3, the refractory wall 15 fits closely against the inner portion of the pipe A' at and beyond the pouring station to prevent leakage of the supplied molten metal through the seam groove and to give shape to the inner wall of the pipe as fusion of the walls of the groove and supplied molten metal takes place and while these fused portions set. As the pipe moves beyond the auxiliary heating means 38, it passes to and between the rolling down and sizing rollers 21. As shown in Fig. 8, I provide four rolling down and sizing rolls 20 arranged in co-operative relation, the upper and lower rolls being fixedly mounted on transverse shafts 43 supported in bearing blocks 44. The blocks 44 are removably supported in guides 45, provided in standards 46. The bearing blocks for the upper shaft 43 are supported on compression springs 44a and held in position against the springs, by screws 47. The side rolls 20 are loosely mounted on vertical shafts supported at their upper and lower ends in sleeves 48, loosely surrounding and supported by the shafts 43. These sleeves together with collars 49 serve as spacers between the upper and lower rolls 20 and the bearing blocks for their shafts. The rolling down and sizing mechanism 21 is preferably arranged relatively close to the pouring mechanism 25, so that the progressive portions of each pipe will pass to and between the rolls 20 before the molten metal forming the welding seam has cooled to any substantial extent, thereby enabling the upper roll 20 to roll down and compress this metal while it is still in or at a white heat temperature. To insure this condition, the auxiliary heating means may be regulated to prevent undue cooling of the molten metal in the seam groove. The shaft 43 for the lower roll has an extended portion on which is fixed ($a$) a worm gear 21a in mesh with the adjacent worm 7$b'$ and ($b$) a gear 21$b$ in mesh with a gear 21c fixed to the extended portion of the shaft 43 for the upper roll 20, whereby the upper roll 20 and lower roll are positively driven.

In Fig. 12 I have shown a modified form of construction when for any reason it is found necessary to increase the capacity of the preliminary heating means 16; for example, where the melting point of the metal of which the pipe sections are formed is relatively high, the metal walls are relatively thick or the speed of the pipe sections endwise is too high to permit of sufficient heating with a single heating means. In the construction shown in this view I provide a supplemental preliminary heating means indicated as an entirety at 16'. These means 16' preferably consist of a pipe 50 for supplying gaseous or liquid fuel suitably supported at its outer end by a support 50' interposed rearwardly of the last or final pair of shaping rolls 2'' and extending outwardly horizontally within the formed pipe sections as or following the forming of the latter. The pipe 50 is provided with a plurality of spaced jets or nozzles 51 projecting upwardly therefrom. The nozzles 51 are preferably arranged in line with the seam groove $a'$ so that their flames play upon the marginal edges thereof, or they may be arranged in pairs or alternately related, at a slight angle to the vertical so that certain nozzles will play directly on the pipe wall at one side of and adjacent to the groove and the remainder play upon the pipe wall at the other side of and adjacent the groove. In this form of construction the mandrel 8'' is relatively short, extending from a point rearwardly of the pouring station (to the left as shown in Fig. 12) outwardly any desired distance, preferably to a point beyond the auxiliary heating means 38.

In this form of mandrel construction, the passages 8a' in the mandrel are respectively connected in a suitable manner with supply and discharge pipes 52, 53, for the cooling medium (such as water), these pipes extending through and being supported by the support 50' in a well known manner. The outer ends of the passages 8a' are connected as shown at 8x'.

Where it is desirable to use acetylene and oxygen as the as the fuel for the preliminary heating means and auxiliary heating means, such means may be constructed as shown in Figs. 14 and 15. In this form of construction the gas supply pipes for each means are similarly arranged, being preferably in superposed relation, as shown at 54, 55, each nozzle 54a leading downwardly from the upper pipe 54 and extending through the lower pipe 55 and in concentric relation to and within the nozzle 55a leading downwardly from the latter pipe, so that their discharge ends are in co-ordinated flame generating relation and in operative relation to the walls and adjacent portions of the metal.

From the foregoing description it will be noted that I have provided an apparatus and a method wherein pipes of varyng sizes with respect to diameter and length may be rapidly and economically made and that the resulting product is both liquid and gas tight, and that danger of leakage developing by reason of the shipment, handling and laying of the pipes is eliminated since the seam from end to end of the pipes is welded.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, means for supporting metal walls with their side edges in opposed relation, means for heating said side edges and the marginal portions adjacent thereto to a temperature less than the melting point of the metal, means for pouring molten metal into the space between said side edges, means for effecting relative movement between the metal walls and the heating means arranged above and in line with the metal filled space between said side edges for applying heat to the metal therein.

2. In apparatus of the class described, means for supporting metal walls with their side edges in opposed relation, means for heating said side edges and the marginal portions adjacent thereto to a temperature less than the melting point of the metal of said walls, means for pouring into the space between said side edges molten metal, means for effecting relative movement between said metal walls and the heating means and the pouring means, means arranged above and in line with the metal filled space between said side edges for applying heat to the metal therein, and means for working the molten metal delivered to the space between said edges.

3. In apparatus of the class described, the combination of means for forming a metal sheet into tube form with its longitudinal side edges in opposed relation, a mandrel formed with a channel in line with the space between said side edges and having deflecting side walls, means for heating the marginal portions of said edges to a temperature below the melting point of the metal of a sheet, said heating means comprising a series of flame jets in line with the space between said edges, whereby the flames and generated heat may pass through the space into said channel and be deflected to heat the interior marginal portions of said edges, and means for delivering molten metal into the space between said edges.

4. In apparatus of the class described, means for forming a metal sheet into tube form with its side edges in opposed, spaced relation, means for pouring molten metal into the space between said side edges, and means arranged above and in line with the metal filled space between said side edges for applying heat to the metal therein.

5. In apparatus of the class described, means for forming a sheet metal into tube form with its side edges in opposed, spaced relation, means for heating the marginal portions of said side edges to a temperature less than the melting point of the metal of the sheet, means for pouring into the space between said side edges molten metal, and means arranged above and in line with the metal filled space between said side edges for applying heat to the metal therein.

6. In apparatus of the class described, means for supporting and moving endwise a tubular member having a seaming groove from end to end, and means for pouring molten metal between said groove as said member moves endwise, said means comprising a support, a holder for the molten metal having a pouring nozzle and means for raising and tilting the holder while maintaining the nozzle in a predetermined relation to the seaming groove.

7. In apparatus of the class described, the combination of a mandrel, means for forming a metal sheet into tube form with its side edges in opposed, spaced relation and delivering it to said mandrel, means for heating the marginal portion of said side edges, said means comprising devices disposed exterior to the tube and in said mandrel in line with said side edges, means for pouring into the space between said side edges molten metal, and means for effecting relative movement between the tube and the heating means and the pouring means.

8. The herein disclosed process of welding a metal pipe having a seam groove extending from end to end, which consists in moving the pipe relative to a heating means to heat the opposed walls of the groove to a temperature below the melting point of the metal of said walls, then in pouring into the seam groove molten metal having a temperature higher than the melting temperature of the metal of said walls, and then applying heat to the metal poured into the seam groove to prevent rapid cooling of the metal.

9. In apparatus of the class described, means for forming a sheet of metal into tubular form with its side edges in opposed relation, means for heating the exterior marginal edges of said metal, means within the tubular form for heating the interior marginal edges of the metal, and means for pouring molten metal into the space between said side edges.

10. In apparatus of the class described, means for forming a sheet of metal into tubular form with its side edges in opposed relation, means for heating the exterior marginal edges of said metal, means within the tubular form for heating the interior marginal edges of the metal, means for pouring molten metal into the space between said side edges, and means for effecting relative movement between said pouring means and the tubular form in a direction parallel to said side edges.

In testimony whereof, I have hereunto affixed my signature.

HOWARD I. MORRIS.